United States Patent
Lin (10) Patent No.: US 11,035,485 B2
(45) Date of Patent: Jun. 15, 2021

(54) FAUCET STRUCTURE

(71) Applicant: HSUE SAM ENTERPRISE CO., LTD, Changhua County (TW)

(72) Inventor: Wen-Tsung Lin, Changhua County (TW)

(73) Assignee: HSUE SAM ENTERPRISE CO., LTD., Changhua County (TW)

( * ) Notice: Subject to any disclaimer, the term of this patent is extended or adjusted under 35 U.S.C. 154(b) by 82 days.

(21) Appl. No.: 16/383,292

(22) Filed: Apr. 12, 2019

(65) Prior Publication Data

US 2020/0326005 A1    Oct. 15, 2020

(51) Int. Cl.
*F16K 27/06* (2006.01)
*E03C 1/04* (2006.01)

(52) U.S. Cl.
CPC ............ *F16K 27/06* (2013.01); *E03C 1/0403* (2013.01); *E03C 1/0404* (2013.01); *E03C 1/0412* (2013.01); *Y10T 137/9464* (2015.04)

(58) Field of Classification Search
CPC ...... E03C 1/0403; E03C 1/0404; F16K 27/06; Y10T 137/9464
USPC .............................................. 4/677; D23/238
See application file for complete search history.

(56) References Cited

U.S. PATENT DOCUMENTS

| | | | | |
|---|---|---|---|---|
| 3,871,406 A * | 3/1975 | Anderson | ............... | F16K 27/00 137/801 |
| 4,387,738 A * | 6/1983 | Bisonaya | ............... | E03C 1/0404 137/801 |
| 4,889,165 A * | 12/1989 | Newcombe | ............... | E03C 1/04 137/801 |
| 5,027,851 A * | 7/1991 | Drees | .................... | E03C 1/0403 137/359 |
| 5,165,121 A * | 11/1992 | McTargett | ................ | E03C 1/02 137/801 |
| 5,279,329 A * | 1/1994 | Pippel | ..................... | E03C 1/023 137/625.29 |
| 5,368,071 A * | 11/1994 | Hsieh | ........................ | E03C 1/04 137/625.17 |

(Continued)

FOREIGN PATENT DOCUMENTS

EP        0632220 A2 *  1/1995  .......... E03C 1/0403
WO  WO-2009069157 A1 *  6/2009  .......... E03C 1/0404

OTHER PUBLICATIONS

Times Square Monoblock Lavatory Faucet. Installation Instructions. AS America, Inc., 2015 [retrieved Aug. 26, 2020], <URL:https://www.americanstandard-us.com/-/media/sites/asus/files/product-instruction-manuals/bathroom-sink-faucets/2017/installationinstructions-7184101.pdf?la=en> (Year: 2015).*

(Continued)

*Primary Examiner* — Kenneth Rinehart
*Assistant Examiner* — Richard K. Durden (57) ABSTRACT

A faucet structure includes a valve base, an outlet hose, two input hoses, a bottom panel, a housing, a panel cover and a handle. A valve chamber is on the valve base, and a connecting tube protrudes from a supporting leg extending from a bottom of the valve chamber, which has first engaging openings at a bottom end thereof for engaging with rings grooves on the input hoses via a locking panel. Two second engaging openings are on the connecting tube for engaging with a groove on the outlet hose via a U-shaped clasp. The housing has grooves that slidingly engage the panel cover.

7 Claims, 7 Drawing Sheets

(56) References Cited

U.S. PATENT DOCUMENTS

| | | | | |
|---|---|---|---|---|
| 5,803,120 | A * | 9/1998 | Bertoli | E03C 1/04 137/801 |
| 6,161,230 | A * | 12/2000 | Pitsch | E03C 1/04 4/676 |
| 6,619,320 | B2 * | 9/2003 | Parsons | E03C 1/05 137/624.11 |
| D517,169 | S * | 3/2006 | Ogata | E03C 1/04 D23/238 |
| D841,129 | S * | 2/2019 | Garland | E03C 1/04 D23/238 |
| 10,233,617 | B1 * | 3/2019 | He | E03C 1/0403 |
| 2007/0271695 | A1 * | 11/2007 | Thomas | F16K 19/006 4/675 |
| 2007/0272312 | A1 * | 11/2007 | Chang | E03C 1/04 137/606 |
| 2009/0272445 | A1 * | 11/2009 | Shimizu | E03C 1/0404 137/801 |
| 2009/0277520 | A1 * | 11/2009 | Wang | E03C 1/0401 137/801 |
| 2011/0089263 | A1 * | 4/2011 | Hughett | E03C 1/084 239/428.5 |
| 2011/0174403 | A1 * | 7/2011 | Lin | E03C 1/04 137/602 |
| 2012/0048394 | A1 * | 3/2012 | Lin | F16K 11/0787 137/315.01 |
| 2012/0055571 | A1 * | 3/2012 | Lin | E03C 1/0403 137/625.4 |
| 2014/0261747 | A1 * | 9/2014 | Bares | F16L 37/00 137/15.21 |
| 2015/0198259 | A1 * | 7/2015 | Lin | E03C 1/04 137/603 |
| 2016/0376775 | A1 * | 12/2016 | Tasserit | F16K 27/00 137/801 |
| 2018/0223509 | A1 * | 8/2018 | Awada | E03C 1/0404 |

OTHER PUBLICATIONS

Times Square Monoblock Lavatory Faucet. Datasheet. AS America, Inc., 2017 [retrieved Aug. 26, 2020], <URL:https://www.americanstandard-us.com/-/media/sites/asus/files/product-specs/bathroom-sink-faucets/2017/times-square-single-control-monoblock-faucet-7184101/specsheet-7184101.pdf?la=en> (Year: 2017).*

* cited by examiner

FAUCET STRUCTURE

BACKGROUND OF THE INVENTION

Field of the Invention

The present invention relates to a faucet structure, and more particularly to a modular faucet structure.

Description of the Related Art

Most conventional faucets have a body and a handle connected to an internal water valve. The handle is provided to operate the faucet, enabling the faucet to water turn on or off, or to change the flow of the water. However, traditional faucets are made of metal, which is heavy, has higher costs and slow production speeds. Furthermore, the appearance of the faucet is not changeable, which is inconvenient.

Therefore, it is desirable to provide a faucet structure to mitigate and/or obviate the aforementioned problems.

SUMMARY OF THE INVENTION

An objective of the present invention is to provide a faucet structure, which is capable of mitigating the above-mention problems.

In order to achieve the above mentioned objective, an embodiment faucet structure has: a valve base, an outlet hose, the two input hoses, a bottom panel, a housing, a panel cover, and a handle. A valve chamber is formed above the valve base. A supporting leg extends from a bottom end of the valve chamber, and a connecting tube protrudes from a front of the supporting leg. A respective first engaging opening is disposed on opposing sides of the supporting leg, and a securing base is attached onto the bottom thereof. A bolt is attached to a lower end of the valve base, and a sleeve nut is coupled to the bolt. A respective second engaging opening is arranged longitudinally on opposing sides of the outer circumference of the connecting tube, and the outlet hose is used in combination with a U-shaped clasp. The outlet hose is provided with a groove, an outlet head, a divider and a positioning tab. Each input hose is provided with a ring groove on an outer periphery, and the ring groove is matched with a locking panel. The housing has a first body, a second body, a first assembly opening, a second assembly opening, a through aperture, two grooves, and a ring slot. The panel cover has a first body portion, a second body portion, a third body, a beveled panel, a positioning aperture and a passing section.

Other objects, advantages, and novel features of invention will become more apparent from the following detailed description when taken in conjunction with the accompanying drawings.

DETAILED DESCRIPTION OF THE PREFERRED EMBODIMENT

Figure 1:
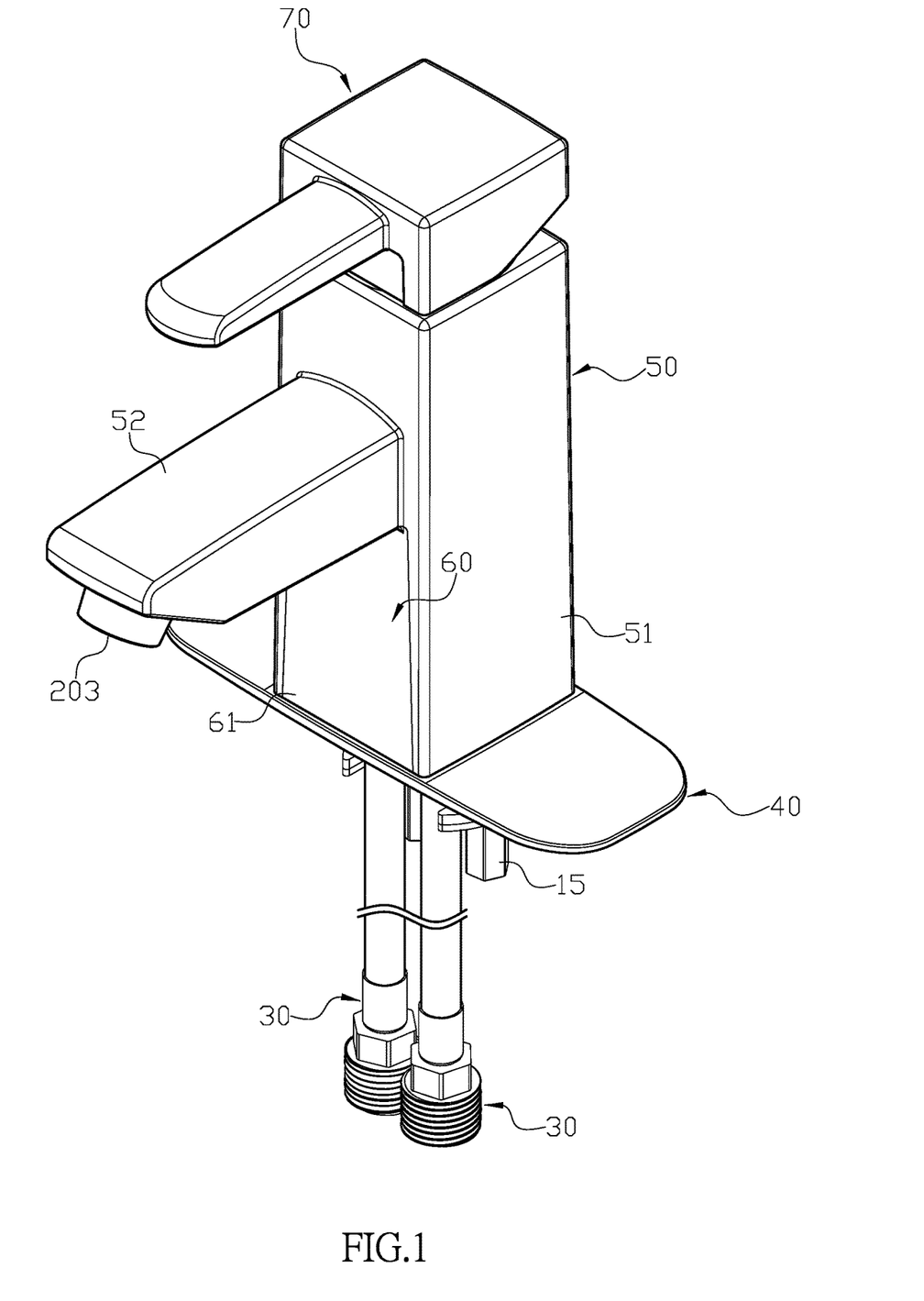
FIG. 1 is a perspective view of a preferred embodiment of the present invention.
Figure 2:
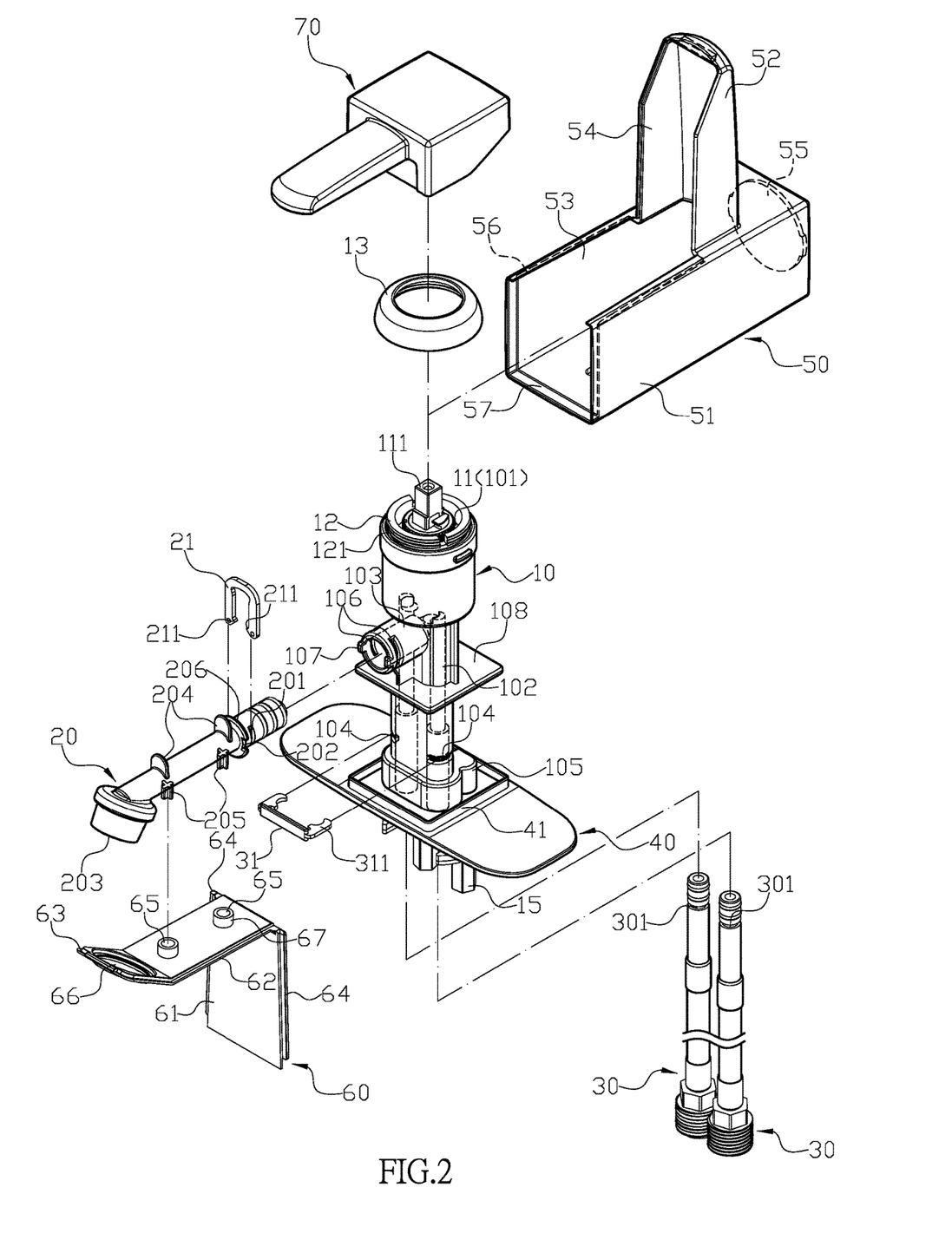
FIG. 2 is a perspective exploded view of the preferred embodiment of the present invention.
Figure 3:
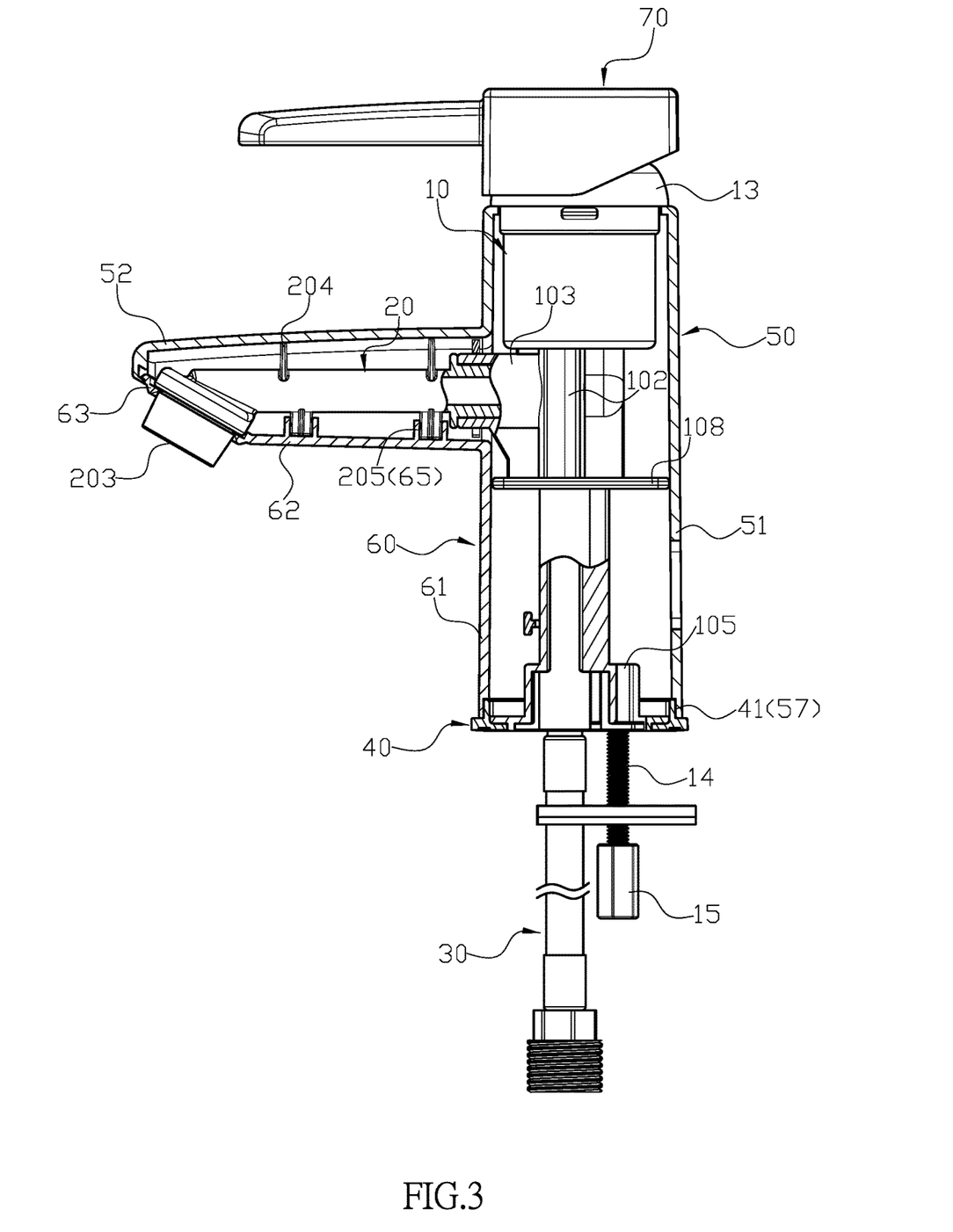
FIG. 3 is a cross-sectional view of the preferred embodiment of the present invention.
Figure 4:
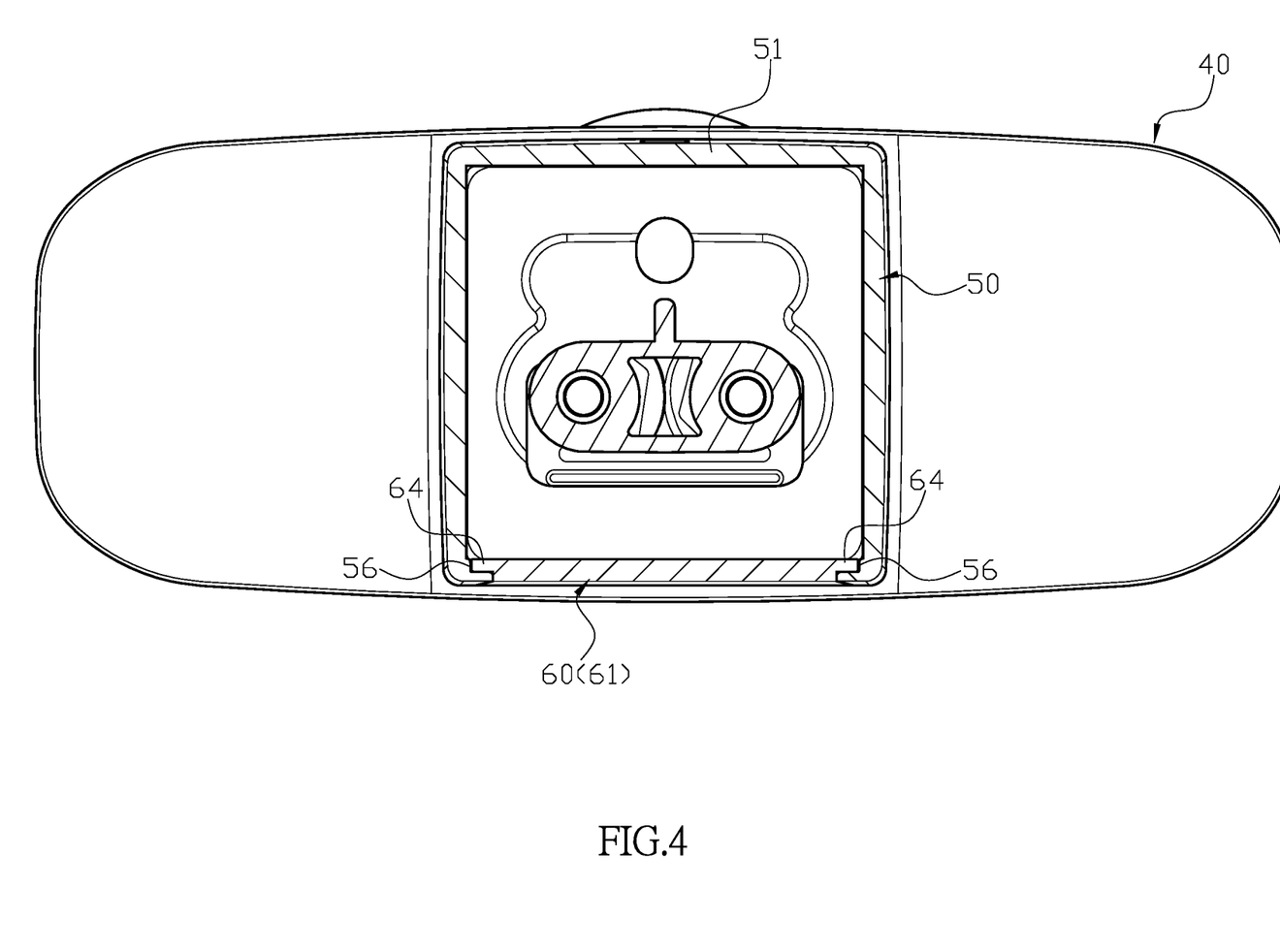
FIG. 4 is another cross-sectional view of the preferred embodiment of the present invention.
Figure 5:
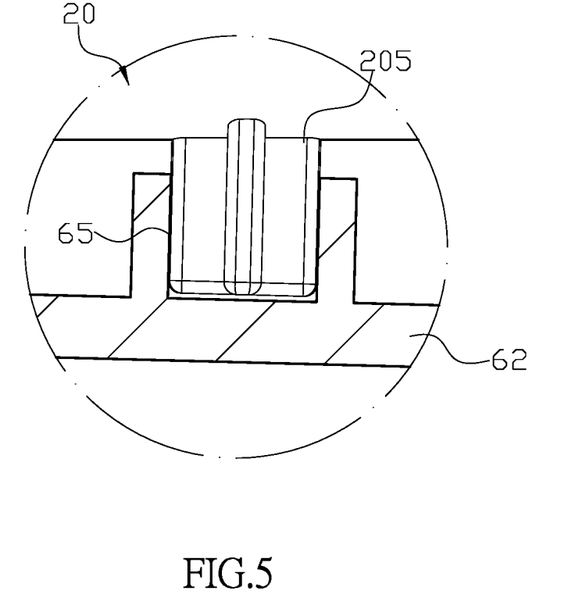
FIG. 5 is a detailed view of the preferred embodiment of the present invention.
Figure 6:
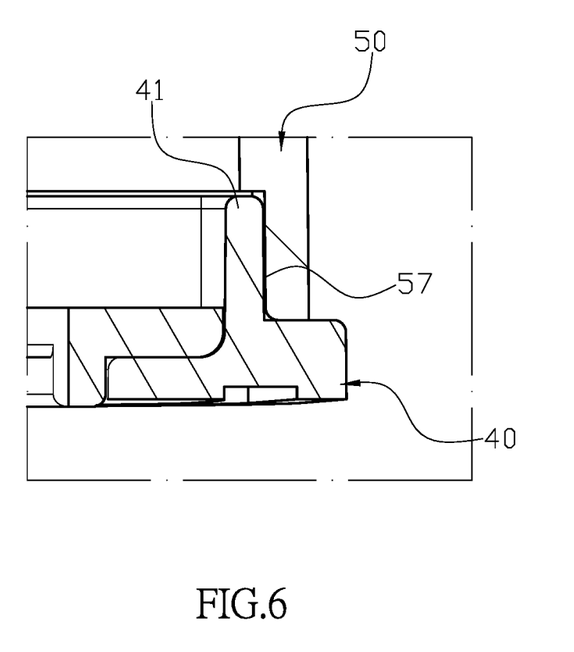
FIG. 6 is another detailed view of the preferred embodiment of the present invention.
Figure 7:
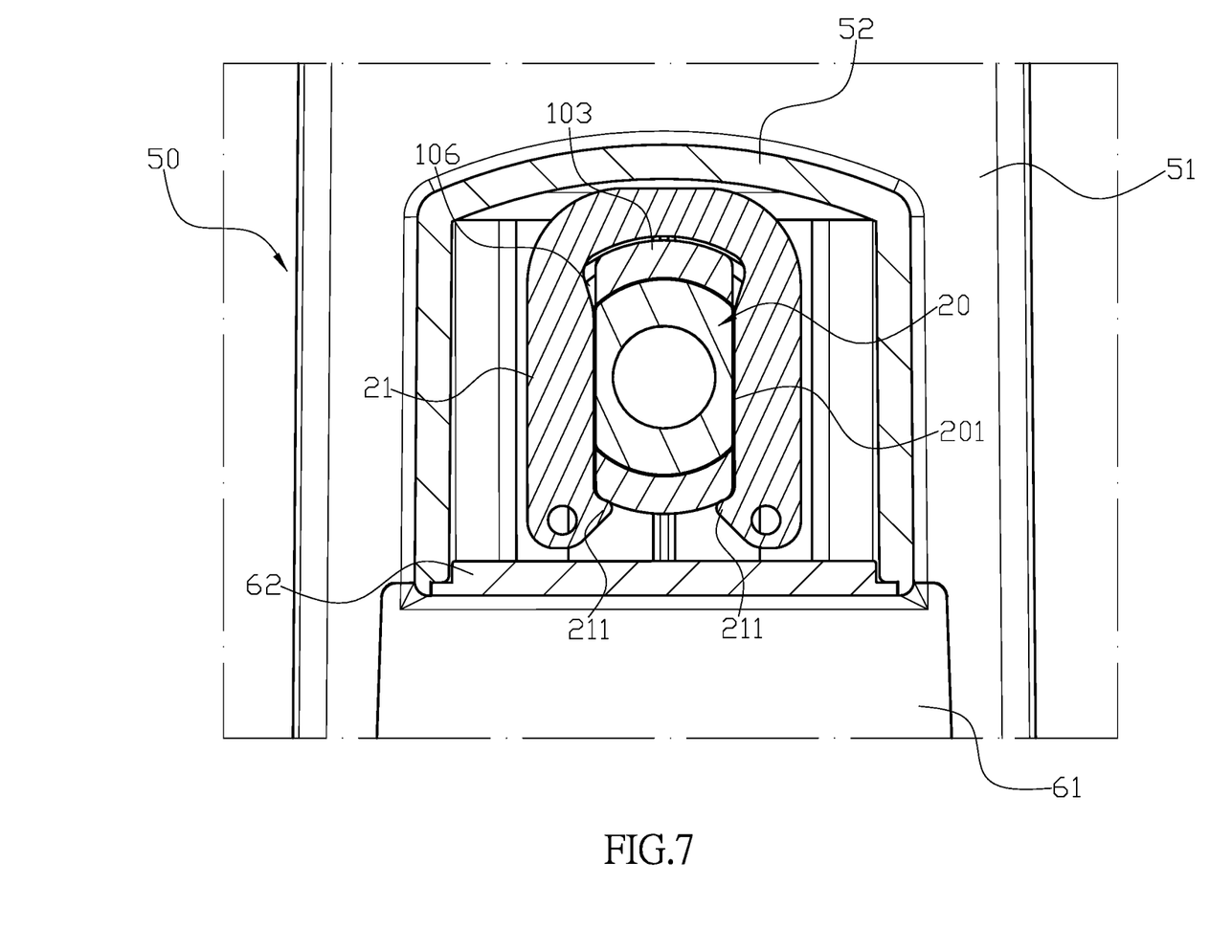
FIG. 7 illustrates a fastening state of a U-shaped clasp according to the preferred embodiment of the present invention.
Figure 8:
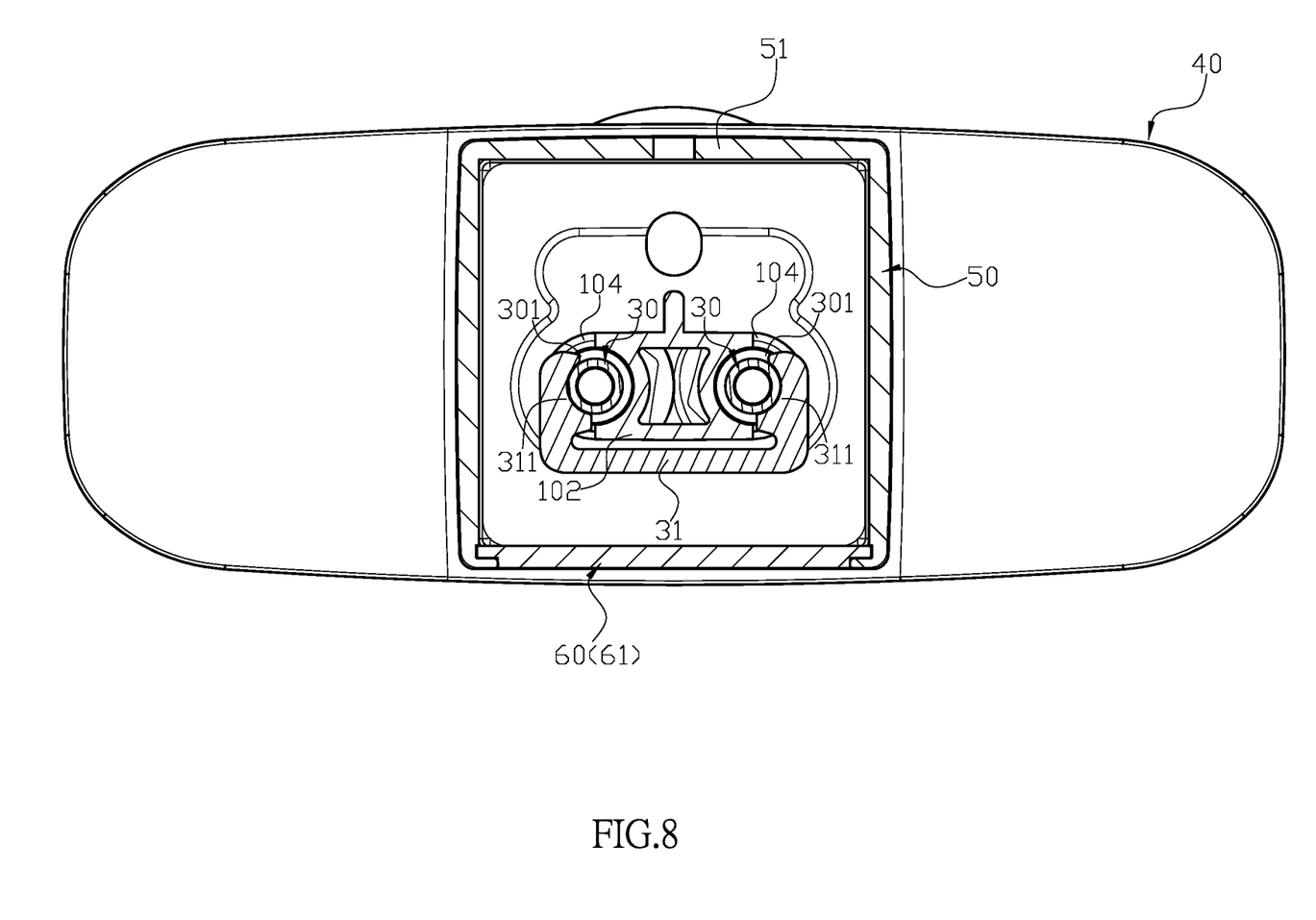
FIG. 8 illustrates a fastening state of a locking panel according to the preferred embodiment of the present invention.

Please refer to FIGS. 1-8. An embodiment faucet comprises: a valve base 10, an outlet hose 20, two input hoses 30, a bottom panel 40, a housing 50, a panel cover 60, and a handle 70.

The valve base 10 has a valve chamber 101 with an inner threaded portion and configured for accepting a control valve 11. A locking portion 12 with an outer threaded portion 121 engages the inner threaded portion to urge and secure the control valve 11 in the valve chamber 101. The control valve 11 comprises an operating handle 111 extending from the threaded locking portion 12, and the outer threaded portion 121 of the locking portion 12 engages with an annular cover 13.

A hollow supporting leg 102 is connected to the valve chamber 101 and has a connecting tube 103. The supporting leg 102 also comprises a respective first engaging opening 104 on opposite sides penetrating the supporting leg 102 at a predetermined height. A bolt 14 is connected to a lower end of the valve base 10 via a securing base, and the bolt 14 is provided with a sleeve nut 15. During the installation of the faucet, the sleeve nut 15 is rotated along the bolt 14 until secured against a surface. A respective second engaging opening 106 is disposed on opposite sides of the connecting tube 103 and penetrate through the connecting tube 103. The connecting tube 103 has an engaging member 107 at a front end thereof.

The outlet hose 20 is sleeved onto the connecting tube 103 and has a respective groove 201 on opposite sides of the outlet hose 20. The two grooves 201 are aligned with the two second engaging openings 106 of the connecting tube 103. A U-shaped clasp 21 is placed through the two second engaging openings 106 and clamps with the two grooves 201 to secure engagement between the outlet hose 20 and the connecting tube 103. A stopping edge 206 is provided at a front end of the outlet hose 20 for positioning of the connecting tube 103 and has a positioning opening 202 for engaging with the engaging member 107.

An outlet end of the outlet hose 20 further comprises an outlet head 203, a plurality of dividers 204 disposed and separated from each other on an outer periphery of outlet hose 20, and a plurality of cross-shaped positioning tabs 205 disposed opposite the dividers 204.

Each input hose 30 has a ring groove 301, and when the two input hoses 30 enter into the supporting leg 102 through the securing base 105, the ring grooves 310 of the two input hoses 30 respectively align with the first engaging openings 104 of the supporting leg 102. A locking panel 31 is mounted to secure the input hoses 30 with the supporting leg 102 of the valve base 10. The locking panel 31 comprises two C-shaped fastening members 311 respectively entering through the two first engaging openings 104 and respectively clamping the ring grooves 301 of the two input hoses 30.

The bottom panel 40 is embedded under the securing base 105 and comprises a lip 41. The housing 50 has a first body 51 and a second body 52. The first body 51 has a first assembly opening 53 connected to a second assembly opening 54 of the second body 52. With the connection between the first assembly opening 53 and the second assembly opening 54, the first body 51 and the second body 52 cover the valve base 10, the supporting leg 102 (via first body 51), and the exiting hose 20 (via second body 52). The dividers 204 of the outlet hose 20 support an inner wall of the second body 52.

The first body 51 further comprises a through aperture 55 for receiving the operating handle 111. Two grooves 56 are respectively formed along two sides of the first assembly opening 53, and a ring slot 57 is provided at a bottom edge of the first body 51 and configured to engage with the lip 41 of the bottom panel.

The panel cover 60 has a first body portion 61, a second body portion 62, and a third body portion 63. The first body portion 61 has a beveled edge 64 along two sides. The second body portion 62 has a plurality of positioning apertures 65 corresponding to the positioning tabs 205, and the third body 63 is provided with an opening 66 for receiving the outlet head 203. The two beveled edges 64 slidably engage with the two grooves 56 of the housing 50. The positioning tabs 205 engage with the positioning apertures 65, and the first assembly opening 53 and the second assembly opening 54 are respectively covered by the first body portion 61 and the second body portion 62 of the panel cover 60. The output head 203 passes through the opening 66, and the handle 70 is connected with the operating handle 111 passing through the housing 50.

Furthermore, the supporting leg 102 is provided with an external supporting frame 108.

Also, two ends of the U-shaped clasp 21 respectively have a claw 211 for hooking with an edge of the connecting tube 103.

The second body portion 62 further comprises a plurality of protrusions 67 at a top surface, and the positioning apertures 65 are respectively disposed in the protrusions 67.

The valve base 10, the supporting leg 102, the connecting tube 103, the securing base 105, and the exiting hose 20 are all made of plastic. Alternatively, the bottom panel 40, the housing 50, the panel cover 60, and the handle 70 are all made of plastic. In another alternative, the valve base 10, the supporting leg 102, the connecting tube 103, the securing base 105, the outlet hose 20, the bottom panel 40, the housing 50, the seal cover 60, and the handle 70 are all made of plastic.

With the above structure, since the faucet is made of plastic material and each part is modularized, production and assembly are easier, the overall weight is light, and the manufacturing costs can be reduced by a significant amount. By pulling down the panel cover 60, the positioning apertures 65 can be separated from the respective positioning tabs 205, and housing 50 and the seal cover 60 can be changed simply and at will for different appearances or colors to express personal style. With support from the divider 204 and the engagement between the lip 41 and the ring slot 57, the housing 50 is relatively stable, so as to achieve a modular faucet structure. With the engagement between the U-shaped clasp 21 and the locking panel 31, the installation of the outlet hose 20 and the input hoses 30 does not require tools and can be done quickly by hand.

Although the present invention has been explained in relation to its preferred embodiment, it is to be understood that many other possible modifications and variations can be made without departing from the spirit and scope of invention as hereinafter claimed.

What is claimed is:

1. A faucet structure comprising: a valve base, an outlet hose, two input hoses, a bottom panel, a housing, a panel cover, and a handle, wherein:
    the valve base has a valve chamber with an inner threaded portion and configured for accepting a control valve, the control valve comprising a locking portion with an outer threaded portion engaging the inner threaded portion to urge and secure the control valve in the valve chamber;
    the control valve further comprises an operating handle extending from the outer threaded portion, the outer threaded portion of the locking portion engaging a cover;
    a hollow supporting leg is connected to the valve chamber and comprises a connecting tube, the hollow support leg further comprising a respective first engaging opening on opposing sides penetrating the hollow supporting leg at a predetermined height;
    a bolt is coupled to a lower end of the valve base via a securing base, the bolt configured to engage with a sleeve nut;
    a respective second engaging opening is disposed on opposite sides of the connecting tube and penetrates through the connecting tube, the connecting tube further comprising an engaging member at a front end;
    the outlet hose is coupled to the connecting tube and has a respective groove on opposite sides of the outlet hose, the two grooves of the outlet hose aligned with the two second engaging openings of the connecting tube;
    the faucet structure further comprises a U-shaped clasp configured to engage the two second engaging openings to clamp the two grooves of the outlet hose to couple together the outlet hose and the connecting tube;
    the outlet hose further comprises a stopping edge configured to engage the connecting tube and has a positioning opening for engaging with the engaging member of the connecting tube;
    the outlet hose further comprises an outlet end with an output head, a plurality of dividers spaced along an outer periphery of the outlet hose, and a plurality of cross-shaped positioning tabs disposed opposite the dividers;
    each input hose comprises a ring groove, the two input hoses configured to enter into the supporting leg through the securing base, the ring grooves of the two input hoses respectively configured to align with the first engaging openings of the supporting leg;
    the faucet structure further comprises a locking panel configured to couple the input hoses with the supporting leg of the valve base, the locking panel comprising two C-shaped fastening members respectively configured to enter through the two first engaging openings and engage the respective ring grooves of the two input hoses;
    the bottom panel is disposed under the securing base and comprises a lip;
    the housing has a first body and a second body, the first body having a first assembly opening connected to a second assembly opening of the second body, wherein with the connection between the first assembly opening and the second assembly opening, the first body and the second body cover the valve base, the supporting leg, and the outlet hose, and the dividers of the outlet hose support an inner wall of the second body;
    the first body further comprises a through aperture for receiving the operating handle, two grooves respectively formed along two sides of the first assembly opening, and a slot provided at a bottom edge of the first body and configured to engage with the lip of the bottom panel;

the panel cover has a first body portion, a second body portion, and a third body portion, the first body portion having two beveled panels, each of the two beveled panels extending from a respective side of the first body portion, the second body portion having a plurality of positioning apertures corresponding to the positioning tabs, and the third body portion is provided with an opening for receiving the output head; and the two beveled panels are configured to slidably engage with the two grooves of the housing, the positioning tabs are configured to engage with the positioning apertures, the first assembly opening and the second assembly opening respectively are coverable by the first body portion and the second body portion of the seal cover, the output head is sized to pass through the opening of the third body portion, and the handle is connectable to the operating handle passing through the housing.

2. The faucet structure as claimed in claim 1, wherein the supporting leg further comprises an external supporting frame.

3. The faucet structure as claimed in claim 1, wherein two ends of the U-shaped clasp respectively have a claw for hooking with an edge of the connecting tube.

4. The faucet structure as claimed in claim 1, wherein the second body portion further comprises a plurality of protrusions at a top surface, and the positioning apertures are respectively disposed in the protrusions.

5. The faucet structure as claimed in claim 1, wherein the valve base, the supporting leg, the connecting tube, the securing base, and the outlet hose are all made of plastic.

6. The faucet structure as claimed in claim 1, wherein the bottom panel, the housing, the panel cover, and the handle are all made of plastic.

7. The faucet structure as claimed in claim 1, wherein the valve base, the supporting leg, the connecting tube, the securing base, the outlet hose, the bottom panel, the housing, the panel cover, and the handle are all made of plastic.

\* \* \* \* \*